(12) United States Patent
Jung et al.

(10) Patent No.: US 9,690,459 B2
(45) Date of Patent: Jun. 27, 2017

(54) DISPLAY APPARATUS AND USER INTERFACE SCREEN DISPLAYING METHOD USING THE SAME

(71) Applicant: SAMSUNG ELECTRONICS CO., LTD., Suwon-si (KR)

(72) Inventors: Han-chul Jung, Seongnam-si (KR); Olivia Lee, Seoul (KR); Jin-mi Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 557 days.

(21) Appl. No.: 14/133,792

(22) Filed: Dec. 19, 2013

(65) Prior Publication Data
US 2014/0337771 A1  Nov. 13, 2014

(30) Foreign Application Priority Data
May 10, 2013 (KR) .................. 10-2013-0053215

(51) Int. Cl.
*G06F 3/048* (2013.01)
*G06F 3/0484* (2013.01)
*G06F 9/44* (2006.01)
*G11B 27/34* (2006.01)
*G06F 3/0482* (2013.01)
*G06F 3/0488* (2013.01)

(52) U.S. Cl.
CPC ........ *G06F 3/04842* (2013.01); *G06F 3/0482* (2013.01); *G06F 3/04847* (2013.01); *G06F 3/04883* (2013.01); *G06F 8/34* (2013.01); *G06F 8/38* (2013.01); *G11B 27/34* (2013.01)

(58) Field of Classification Search
CPC ............................ G06F 3/048–3/04886; G06F 17/30038–17/30994
See application file for complete search history.

(56) References Cited

U.S. PATENT DOCUMENTS

| 7,064,772 B1 | 6/2006 | Thompson et al. |
| 9,104,301 B2 | 8/2015 | Kim et al. |
| 2006/0015818 A1* | 1/2006 | Chaudhri .............. G06F 3/0481 715/779 |

(Continued)

FOREIGN PATENT DOCUMENTS

| EP | 2175367 A2 | 4/2010 |
| KR | 10-2003-0019410 A | 3/2003 |

(Continued)

OTHER PUBLICATIONS

Communication, dated Jul. 11, 2014, issued by the European Patent Office in counterpart Patent Application No. 14152515.4.

(Continued)

*Primary Examiner* — Claudia Dragoescu
(74) *Attorney, Agent, or Firm* — Sughrue Mion, PLLC

(57) ABSTRACT

A display apparatus includes an input unit receiving a user command for configuring a main user interface (UI) screen for controlling content reproduction, and a controller configuring the main UI screen including at least one UI element selected by the user command and display the main UI screen configured according to the user command on a display, wherein the at least one UI element is a graphic element to which a function associated with the content reproduction is mapped.

22 Claims, 25 Drawing Sheets

(56) References Cited

U.S. PATENT DOCUMENTS

| | | | |
|---|---|---|---|
| 2009/0228820 A1* | 9/2009 | Kim | G06F 3/04817 715/769 |
| 2012/0050185 A1 | 3/2012 | Davydov et al. | |
| 2012/0176382 A1* | 7/2012 | Noh | G06F 3/0488 345/428 |
| 2014/0123006 A1* | 5/2014 | Chen | H04N 21/25891 715/716 |
| 2015/0286358 A1 | 10/2015 | Kim et al. | |

FOREIGN PATENT DOCUMENTS

| | | |
|---|---|---|
| KR | 10-2009-0096149 A | 9/2009 |
| WO | 2011100115 A1 | 8/2011 |

OTHER PUBLICATIONS

Communication dated Apr. 20, 2017 issued by Korean Intellectual Property Office in counterpart Korean Application No. 10-2013-0053215.

* cited by examiner

DISPLAY APPARATUS AND USER INTERFACE SCREEN DISPLAYING METHOD USING THE SAME

CROSS-REFERENCE TO RELATED APPLICATION(S)

This application claims priority from Korean Patent Application No. 2013-0053215, filed on May 10, 2013, in the Korean Intellectual Property Office, the disclosure of which is incorporated herein by reference in its entirety.

BACKGROUND

1. Field

Apparatuses and methods consistent with the exemplary embodiments relate to providing a display apparatus and a user interface (UI) screen displaying method, and more particularly, to providing a display apparatus, which displays a UI screen for controlling content reproduction, and a UI screen displaying method using the same.

2. Description of Related Art

With recent developments in the content industry, users may now enjoy various content reproduced through their electronic devices.

Electronic devices reproduce content through a player capable of reproducing content. In the content players of the related art, a user may be inconvenienced because UI elements for providing functions unnecessary for the user may be disposed on a UI. Accordingly, a user must search for a desired function before it may be executed.

Thus, there is a need for an approach for providing a more intuitive interface by configuring a screen with only UI elements capable of providing user-desired functions.

SUMMARY

Exemplary embodiments address at least the above problems and/or disadvantages and other disadvantages not described above. Also, the exemplary embodiments are not required to overcome the disadvantages described above, and an exemplary embodiments may not overcome any of the problems described above.

One or more exemplary embodiments provide a display apparatus and a UI screen displaying method using the same that can provide a more intuitive interface by allowing a user to select a UI element mapped to a function associated with content reproduction and dispose the selected UI element at a desired position.

According to an aspect of an exemplary embodiment, there is provided a display apparatus including: an input unit configured to receive a user command for configuring a main UI screen for controlling content reproduction; and a controller configured to configure the main UI screen including at least one UI element selected by the user command and display the main UI screen configured according to the user command on a display, wherein the at least one UI element is a graphic element to which a function associated with the content reproduction is mapped.

When a preset event is generated, the controller may display a sub-UI screen including a plurality of UI elements, and configure the main UI screen including at least one UI element selected on the sub-UI screen.

The controller may simultaneously display the main UI screen and the sub-UI screen, move a selected UI element to the main UI screen, and display the selected UI element on the main UI screen according to a user command for moving the selected UI element to the main UI screen by selecting the UI element displayed on the sub-UI screen.

The controller may display a plurality of UI elements mapped to different graphic elements having the same function associated with the content reproduction on the sub-UI screen.

The controller may group the plurality of UI elements based on functions provided by the plurality of UI elements and display UI elements that provide the same function in regions adjacent to each other.

The controller may display a plurality of UI elements, mapped to different graphic elements having different functions associated with the content reproduction, on the sub-UI screen.

The controller may remove at least one UI element displayed on the main UI screen according to the user command.

The at least one UI element may include at least one of a UI element mapped to a function of reproducing genre-specific content, a UI element mapped to a function of reproducing time band-specific content, a UI element mapped to a function of reproducing content corresponding to a keyword input by a user, and a UI element mapped to a function of reproducing other content associated with content currently being reproduced.

The display apparatus may include a display.

According to an aspect of another exemplary embodiment, there is provided a UI screen displaying method for use in a display apparatus including: receiving a user command for configuring a main UI screen for controlling content reproduction; and configuring and displaying the main UI screen including at least one UI element selected by the user command, wherein the at least one UI element is a graphic element to which a function associated with the content reproduction is mapped.

The displaying may include: displaying, when a preset event is generated, a sub-UI screen including a plurality of UI elements; and configuring and displaying the main UI screen including at least one UI element selected on the sub-UI screen.

The displaying may include: simultaneously displaying the main UI screen and the sub-UI screen; moving a selected UI element to the main UI screen, and displaying the selected UI element on the main UI screen according to a user command for moving the selected UI element to the main UI screen by selecting the UI element displayed on the sub-UI screen.

The displaying may include: displaying a plurality of UI elements, mapped to different graphic elements having the same function associated with the content reproduction, on the sub-UI screen.

The displaying may include: grouping the plurality of UI elements based on functions provided by the plurality of UI elements and displaying UI elements that provide the same function in regions adjacent to each other.

The displaying may include: displaying a plurality of UI elements, mapped to different graphic elements having different functions associated with the content reproduction, on the sub-UI screen.

The displaying may include: removing at least one UI element displayed on the main UI screen according to the user command.

The at least one UI element may include at least one of a UI element mapped to a function of reproducing genre-specific content, a UI element mapped to a function of reproducing time band-specific content, a UI element mapped to a function of reproducing content corresponding to a keyword input by a user, and a UI element mapped to a function of reproducing other content associated with content currently being reproduced.

According to an aspect of another exemplary embodiment, there is provided a method of configuring a user interface (UI) screen of a content player, the method including: displaying a main UI screen for controlling content reproduction on the content player; displaying concurrently with the main UI screen, if a first preset event occurs, a sub-UI screen which includes a plurality of UI elements; and in response to receiving a user input to select and move a UI element of the plurality of UI elements to a position on the main UI screen, moving the UI element to the position on the main UI screen.

Each of the plurality of UI elements may be a graphic element mapped to a function associated with the content reproduction.

The function associated with content reproduction may include at least one of: reproducing genre-specific content, reproducing time band-specific content, reproducing content corresponding to a keyword input by a user, and reproducing other content associated with content currently being reproduced.

The method may further include hiding, if a second present event occurs, the concurrently displayed sub-UI screen.

The method may further include saving a present configuration of UI elements on the main UI screen.

The plurality of UI elements included on the sub-UI screen may be displayed based on their respective functions and UI elements having the same function may be displayed in regions adjacent to each other.

The method may further include in response to receiving a user input to remove a UI element on the main UI screen, removing the UI element from the main UI screen.

The content player may include a smartphone including a touch screen, and the first present event and the user input may be touch operations input by the user.

According to the various exemplary embodiments, as described above, a user may configure a UI screen for controlling content reproduction by selecting a UI element among UI elements mapped to a function associated with content reproduction and disposing the selected UI element at a desired position. Thus, because the user may customize his/her desired UI screen for controlling the content reproduction, the convenience for the user may be improved.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
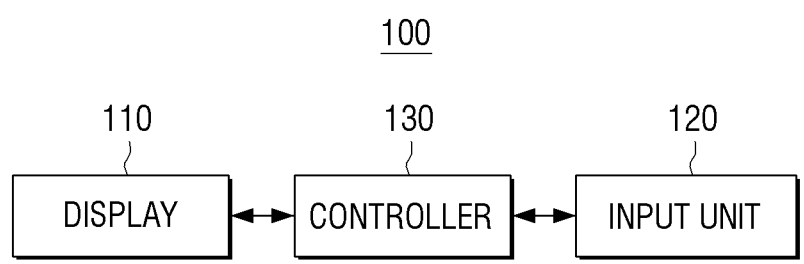
FIG. 1 is a block diagram illustrating a configuration of a display apparatus according to an exemplary embodiment.

Certain exemplary embodiments will now be described in greater detail with reference to the accompanying drawings.

In the following description, same drawing reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

As used herein, expressions such as "at least one of," when preceding a list of elements, modify the entire list of elements and do not modify the individual elements of the list.

FIG. 1 is a block diagram illustrating a configuration of a display apparatus according to an exemplary embodiment. According to FIG. 1, the display apparatus 100 includes a display 110, an input unit 120, and a controller 130. Here, the display apparatus 100 may be implemented as various types of electronic devices such as a smartphone, a tablet, a television (TV), a desktop personal computer (PC), a notebook, etc.

The display 110 displays various UI screens. Specifically, the display 110 may display a main UI screen for controlling content reproduction and a sub-UI screen including a plurality of UI elements to which functions associated with the content reproduction are mapped.

As a UI screen for controlling content to be reproduced in the display apparatus 100, the main UI screen may include at least one UI element. Here, the UI element serves as a graphic element mapped to a function associated with the content reproduction, and the user may control content to be reproduced by the display apparatus 100 by selecting a UI element displayed on the main UI screen.

The UI element displayed on the main UI screen may be provided from the sub-UI screen. That is, the user may configure the main UI screen by selecting only his/her desired UI element among a plurality of UI elements displayed on the sub-UI screen and moving the selected UI element to his/her own desired position on the main UI screen.

The input unit 120 may receive various user commands.

In particular, the input unit 120 may receive a user command for configuring the main UI screen for controlling the content reproduction. Specifically, the input unit 120 may receive various user commands for configuring the main UI screen such as a user command for displaying a sub-UI screen, a user command for selecting at least one of a plurality of UI elements displayed on the sub-UI screen and moving the selected UI element to the main UI screen, a user command for changing a position of a UI element displayed on the main UI screen, a user command for removing a UI element displayed on the main UI screen, and a user command for removing the sub-UI screen.

In addition, the input unit 120 may receive a user command for executing a function associated with the content reproduction. Specifically, because the function associated with the content reproduction is mapped to the UI element, the input unit 120 may receive a user command for selecting a UI element displayed on the main UI screen.

Accordingly, the input unit 120 may be implemented in the form of a touch screen along with the display 110. In this case, the input unit 120 may receive a user command through a touch operation.

The controller 130 controls an overall operation of the display apparatus 100. The controller 130 may include a random access memory (RAM), a read only memory (ROM), and the like for operations of a central processing unit (CPU) and the display apparatus 100.

In particular, the controller 130 may configure the main UI screen, including at least one UI element selected by the user command, and control the main UI screen, configured according to the user command, to be displayed on the display 110.

For this, the controller 130 may display a sub-UI screen including a plurality of UI elements when a preset event is generated, and configure a main UI screen by including at least one UI element selected on the sub-UI screen.

Here, the preset event may be a touch operation by the user of flicking the main UI screen displayed on the display 110.

The flicking operation may be an operation by a user touching the touch screen, quickly tracing a line for a certain distance and at least at a certain speed, and releasing the touch on the touch panel.

In this case, the controller 130 may move the main UI screen in a direction in which the flick operation is performed when the flick operation is input to partially remove the main UI screen from the display 110, gradually newly display the sub-UI screen in the direction in which the flick operation is performed, and display the sub-UI screen in a region from which the main UI screen has been removed.

In addition, the controller 130 may overlap and display the sub-UI screen in one region of the main UI screen by gradually newly displaying the sub-UI screen in a direction in which the flick operation is performed when the flick operation is input.

In this manner, the controller 130 may simultaneously display the main UI screen and the sub-UI screen when the preset event is generated.

The controller 130 may move a selected UI element to the main UI screen to display the selected UI element on the main UI screen according to a user command for selecting the UI element displayed on the sub-UI screen and moving the selected UI element to the main UI screen.

Specifically, the controller 130 may move a UI element to which a touch and drag operation is input from the sub-UI screen to the main UI screen to display the UI element on the main UI screen when a user command for dragging the UI element to the main UI screen by touching one of a plurality of UI elements displayed on the sub-UI screen is input, and may dispose and display the UI element at a position at which the touch is released when the touch on the UI element is released.

In this case, the controller 130 may remove the UI element on the sub-UI screen. That is, the controller 130 may move the UI element displayed on the sub-UI screen to the main UI screen according to the touch and drag operation.

The controller 130 may not remove the UI element from the sub-UI screen. That is, the controller 130 may continuously display the UI element on the sub-UI screen even when the UI element is moved to and displayed on the main UI screen according to the touch and drag operation.

Meanwhile, the controller 130 may change a position of the UI element displayed on the main UI screen according to a user command.

Specifically, when a user command is input to drag a UI element to another region of the main UI screen after the UI element displayed in one region of the main UI screen is touched in a state in which the main UI screen and the sub-UI screen are displayed together, the controller 130 moves the UI element to the region of the main UI screen and displays the UI element on the main UI screen according to the touch and drag operation. When the touch on the UI element is released, the controller 130 may dispose and display the UI element at a position at which the touch is released.

Alternatively, when a user command for dragging a UI element to another region of the main UI screen is input after the UI element displayed in one region of the main UI screen is touched for a preset time or more in a state in which only the main UI screen is displayed, the controller 130 may move the UI element to the region of the main UI screen and display the UI element on the main UI screen according to the touch and drag operation, and dispose and display the UI element at a position at which the touch is released when the touch on the UI element is released.

In addition, the controller 130 may remove at least one UI element displayed on the main UI screen according to a user command.

Specifically, when a user command for releasing the touch is input after the UI element displayed on the main UI screen is touched for a preset time or more in a state in which only the main UI screen is displayed or in a state in which the main UI screen and the sub-UI screen are displayed together, the controller 130 may display a deletion item capable of deleting a corresponding UI element and delete the UI element from the main UI screen when the deletion item is selected. In addition, when the UI element is touched for a preset time or more, the controller 130 may immediately remove the UI element without displaying a separate deletion item.

In this case, the controller 130 may display the UI element removed from the main UI screen on the sub-UI screen. This is applicable to the case in which the UI element displayed on the sub-UI screen is moved to the main UI screen and removed from the sub-UI screen according to the touch and drag operation.

Specifically, when the UI element is deleted in a state in which only the main UI screen is displayed, the controller 130 may include and display the deleted UI element on the sub-UI screen when the sub-UI screen is displayed.

In addition, when the UI element is deleted in a state in which the main UI screen and the sub-UI screen are displayed together, the controller 130 may move the deleted UI element to the sub-UI screen and display the deleted UI element on the sub-UI screen.

In addition, the controller 130 may change a size of at least one UI element displayed on the main UI screen according to a user command.

Specifically, after a user command for releasing the touch is input after the UI element displayed on the main UI screen is touched for a preset time or more in a state in which only the main UI screen is displayed, the controller 130 may change a size of the UI element when a user command for changing the size of the UI element is input.

In addition, the controller 130 may change the size of the UI element when the user command for changing the size of the UI element is input in a state in which the main UI screen and the sub-UI screen are displayed together.

In these cases, the controller 130 may enlarge the size of the UI element when a pinch-in operation is input, and reduce the size of the UI element when a pinch-out operation is input.

The pinch-in operation may be an operation by a user of touching two or more points of the touch screen and stretching the distance between the points. The pinch-out operation may be an operation by a user of touching two or more points of the touch screen and shrinking the distance between the points.

The controller 130 may activate at least one UI element displayed on the main UI screen.

Specifically, the controller 130 may activate at least one UI element displayed on the main UI screen in a state in which only the main UI screen is displayed, and execute a function mapped to a selected UI element when the user selects the UI element.

When the main UI screen and the sub-UI screen are displayed together, the controller 130 may not execute a function mapped to the selected UI element even when the UI element displayed on the main UI screen is selected by deactivating at least one UI element displayed on the main UI screen. In addition, the controller 130 may not execute a function mapped to the selected UI element even when the UI element displayed on the sub-UI screen is selected by deactivating a plurality of UI elements displayed on the sub-UI screen.

In addition, the controller 130 may display another UI element on the sub-UI screen according to a user command.

Specifically, the controller 130 may display a UI element other than a plurality of UI elements currently displayed on the sub-UI screen according to the user command. For example, when the flick operation is input in a state in which the sub-UI screen is displayed, the controller 130 may display a UI element other than the plurality of currently displayed UI elements on the sub-UI screen. In this case, the flick operation may be in a direction different from the direction of the flick operation for displaying the sub-UI screen.

In addition, the controller 130 may delete the sub-UI screen when a preset event is generated. Here, the preset event may be a flick operation in an opposite direction of the flick operation for displaying the sub-UI screen as a touch operation of flicking the main or sub-UI screen displayed on the display 110.

In this case, the controller 130 may gradually remove the sub-UI screen in a direction in which the flick operation is performed, and fully display the main UI screen in a region from which the sub-UI screen has been removed by moving the main UI screen in the direction in which the flick operation is performed.

Alternatively, when the main UI screen and the sub-UI screen have been overlapped and displayed, the controller 130 may gradually remove the sub-UI screen in the direction in which the flick operation is performed and fully display the main UI screen in a region previously hidden by the sub-UI screen.

The UI elements are represented by different graphics, and may be mapped to the same function as each other or different functions from each other in association with content reproduction.

Here, the different graphics may include at least one of a different color and a different shape. When graphics of the UI elements are different, user commands to be input to execute functions mapped to the UI elements may be different from each other.

Specifically, the controller 130 may display a plurality of UI elements mapped to different graphic elements having different functions associated with the content reproduction on the sub-UI screen. That is, the controller 130 may display a plurality of UI elements capable of providing different functions on the sub-UI screen by representing the plurality of UI elements as different graphic elements.

In addition, the controller 130 may display a plurality of UI elements mapped to different graphic elements having the same function associated with the content reproduction on the sub-UI screen. That is, the controller 130 may display a plurality of UI elements capable of providing the same function on the sub-UI screen by representing the plurality of UI elements as different graphic elements.

In this case, the controller 130 may group a plurality of UI elements based on functions provided by the plurality of UI elements and display UI elements capable of providing the same function in regions adjacent to each other. That is, the controller 130 may display UI elements, which are represented by different graphics but are able to provide the same function, in regions adjacent to each other.

Accordingly, as described above, when graphics of the UI elements are different, user commands to be input to execute functions mapped to UI elements may be the same as or different from each other.

Thus, when the user command corresponding to the graphic representing the UI element is input, the controller 130 may execute a function mapped to the UI element.

For example, when the UI element is represented as a touch button type, the controller 130 may execute a function mapped to a corresponding UI element when a user command for touching a touch button UI element is input. In addition, when the UI element is represented in a pinch-in/out button type, the controller 130 may execute a function mapped to a corresponding UI element when a user command of the pinch-in/out operation is input to a pinch-in/out UI element.

As another example, when a UI element is represented as a wheel type or a jog wheel type, the controller 130 may execute a function mapped to a corresponding UI element when a user command for touching and rotating a wheel or jog wheel UI element is input.

As still another example, when the UI element is represented as a jog bar type, the controller 130 may execute a function mapped to a corresponding UI element when a user command for touching and moving a jog bar UI element is input.

Therefore, the user may select a UI element represented by his/her desired graphic among UI elements that provide his/her desired functions and use a function mapped to a UI element by inputting a touch operation corresponding to the UI element.

As described above, the UI element may be a graphic element mapped to a function associated with the content reproduction.

Specifically, the UI element may include at least one of a UI element mapped to a function of reproducing genre-specific content, a UI element mapped to a function of reproducing time band-specific content, a UI element mapped to a function of reproducing content corresponding to a keyword input by the user, and a UI element mapped to a function of reproducing other content associated with content currently being reproduced. At least one UI element may include at least one of UI elements mapped to functions such as a content play function, a stop function, a pause function, and a play function for other content.

Also, the UI element may include a UI element which provides information about content. Here, the information about the content may include a title, a play time, a singer's name, and a related image (e.g., a singer's image, an album image, etc.) of content to be reproduced, and a playlist including corresponding content.

Hereinafter, a method of controlling music reproduction through a UI element displayed on the main UI screen when a content is music will be described more specifically with reference to the accompanying drawings. Hereinafter, for the sake of clarity, it is assumed that the display apparatus 100 is implemented as a smartphone. However, as one of ordinary skill in the art would recognize, the display apparatus could be implemented as any device with a display.

The controller 130 may display the main UI screen according to a user command. Here, the user command may be a command for executing an application (hereinafter referred to as music control application) capable of controlling music reproduction. When a specific button provided on the display apparatus 100 is selected or when an icon representing the music control application on a home screen is selected, the main UI screen may be displayed by executing the music control application.

Figure 2:
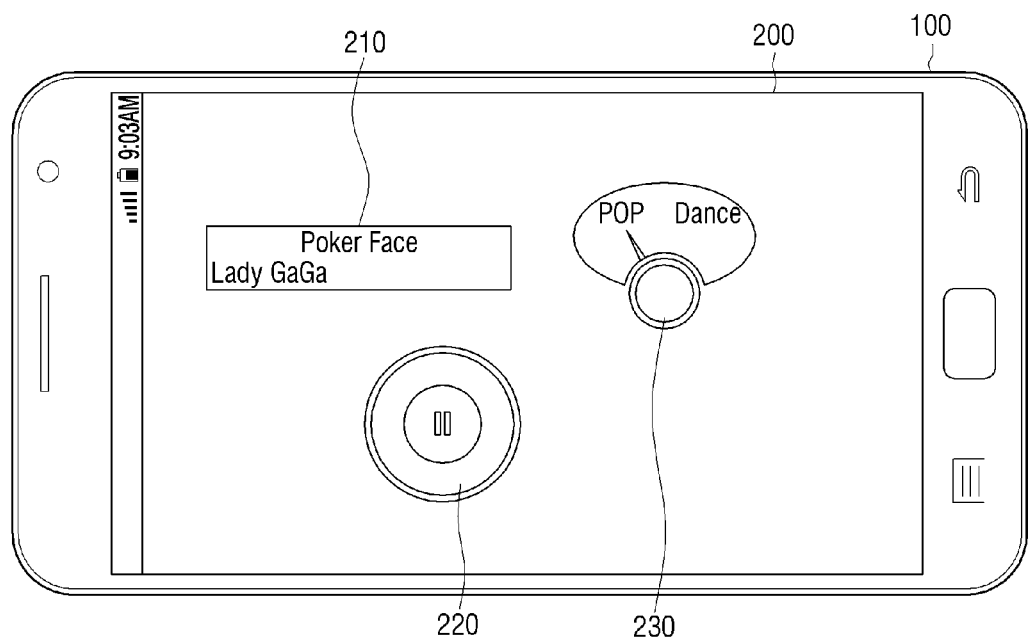
FIGS. 2 to 23 are diagrams illustrating a method of configuring a UI screen according to an exemplary embodiment.

In this case, the controller 130 may display a main UI screen 200, as in FIG. 2. As in FIG. 2, a UI element 210 for providing information about music currently being reproduced, a UI element 220 mapped to music play and pause functions, a volume control function, and a previous/next music play function, and a UI element 230 mapped to a function for reproducing music of a specific genre may be displayed on the main UI screen 200.

Here, the UI elements 210 to 230 constituting the main UI screen 200 may be previously set by the user. That is, when the user has ended the music control application after moving the UI elements 210 to 230 displayed on the sub-UI screen to the main UI screen 200 through the touch and drag operation, the controller 130 may store the final state of the main UI screen before the music control application ends. When the music control application is re-executed thereafter, the controller 130 may display the main UI screen stored in the final state, that is, the main UI screen 200 as in FIG. 2.

In this case, the controller 130 may display a user-specific main UI screen. Specifically, the controller 130 may receive authentication information from the user by displaying a screen for receiving the authentication information (e.g., an identifier (ID) and a password) when the music control application is executed. When the authentication information is input, the controller 130 may display the main UI screen matching the authentication information. For this, the controller 130 may store the final state of the main UI screen configured in a state in which the authentication information has been input according to authentication information.

The controller 130 may reproduce music corresponding to a user command input through the main UI screen 200.

For example, the controller 130 may reproduce music of a genre selected by the UI element 230 when a music play button is touched in that a music play function is implemented as a button type in the UI element 220 displayed on the main UI screen 200 as in FIG. 2.

In reference to FIG. 2, the controller 130 may sequentially reproduce POP music by configuring a playlist for music of a POP genre in a state in which POP is selected through the UI element 230. The controller 130 may display information about a title and a play time of POP music currently being reproduced and a title of the next music to be reproduced through the UI element 210.

Meanwhile, music to be reproduced may be pre-stored in the display apparatus 100 or streamed from an external server (not illustrated).

Specifically, by referring to music metadata pre-stored in the display apparatus 100, the controller 130 may generate a playlist corresponding to a user command input through the main UI screen and sequentially reproduce music included in the playlist.

In addition, the controller 130 may request the external server (not illustrated) to transmit the playlist corresponding to the user command input through the main UI screen and sequentially reproduce music included in the playlist sequentially streamed from the external server (not illustrated). Here, the external server (not illustrated) may be a server which provides a music streaming service.

For example, in reference to FIG. 2, the controller 130 may search for POP music among music pre-stored in the display apparatus 100, generate a playlist constituted of POP music, and sequentially reproduce the POP music included in the playlist. In addition, the controller 130 may request the external server (not illustrated) to transmit the playlist constituted of the POP music among the pre-stored music, receive the playlist, and reproduce the POP music included in the playlist sequentially streamed from the external server (not illustrated).

Figure 3:
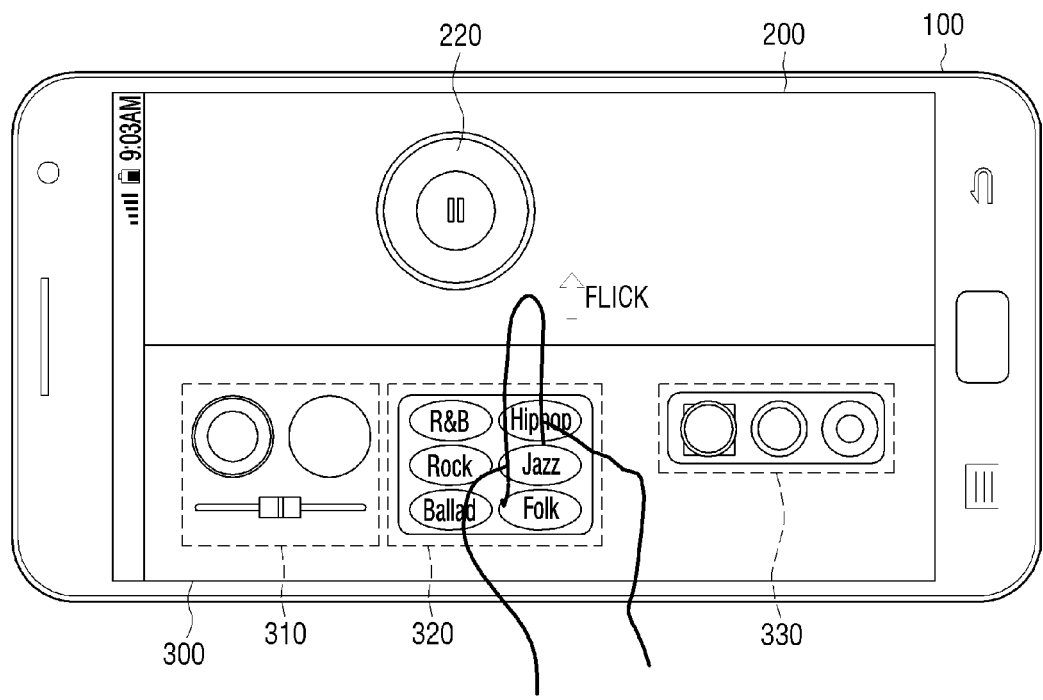

When the flick operation is input in a direction from a lower-side to an upper-side of the display 100, in a state in which the main UI screen 200 has been displayed, the controller 130 may display both the main UI screen 200 and a sub-UI screen 300, as in FIG. 3.

In this case, the controller 130 may remove part of the main UI screen 200 by moving the main UI screen 200 in the upper-side direction, and display the sub-UI screen 300 in a region from which the main UI screen 200 has been removed by gradually newly displaying the sub-UI screen 300 in a direction from the lower-side to the upper-side.

A plurality of UI elements that provide the same function but are represented by different graphics, as in FIG. 3, may be displayed to be adjacent to each other on the sub-UI screen 300.

Specifically, the sub-UI screen 300 may include UI elements 310 mapped to a function of reproducing time band-specific music, UI elements 320 mapped to a function of reproducing genre-specific music, and UI elements 330 mapped to a function of reproducing other content associated with content currently being reproduced.

Here, the UI elements 310 may include a jog bar UI element and a jog wheel UI element, the UI elements 320 may include a button UI element, and the UI elements 330 may include a button UI element that operates in a pinch-in/out operation.

Figure 4:
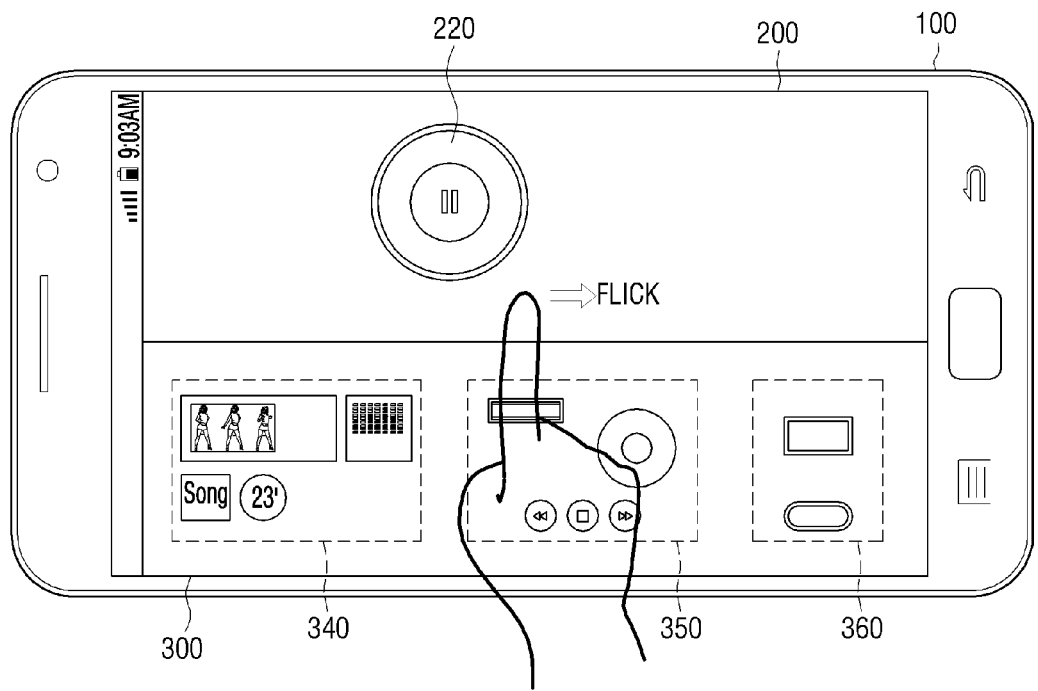

In addition, when the flick operation is input in a direction from left to right on the main UI screen 200 or the sub-UI screen 300, the controller 130 may display a UI element other than currently displayed UI elements on the sub-UI screen 300 as in FIG. 4. Even in this case, a plurality of UI elements that provide the same function, but are represented by different graphics, may be displayed to be adjacent to each other.

Specifically, as in FIG. 4, the newly displayed sub-UI screen 300 may include UI elements 340 for providing information about music currently being reproduced, such as a playlist including the music currently being reproduced, an image associated with the music currently being reproduced, an equalizer, and the like, UI elements 350 mapped to music play, stop, and pause functions and a next/previous music play function, and UI elements 360 mapped to a function of reproducing music corresponding to a keyword input by the user.

Here, the UI elements 350 may include button and wheel UI elements, and the UI elements 360 may include a button UI element.

In addition, when the flick operation is input in a direction from right to left in a state in which the sub-UI screen 300 is displayed as in FIG. 4, the controller 130 may display the sub-UI screen 300 including a plurality of UI elements previously displayed. That is, the controller 130 may display the sub-UI screen 300, as in FIG. 3.

Meanwhile, graphic forms in which the UI elements are represented in FIGS. 3 and 4 are only exemplary, and of course, may be changed in various forms.

In this manner, according to an exemplary embodiment, a plurality of UI elements for providing the same function may be represented and displayed by different graphics. Thus, the user may select a UI element constituted of his/her desired shape and color, move the selected UI element to the main UI screen, and use a function mapped to the UI element by selecting the UI element.

Figure 5:
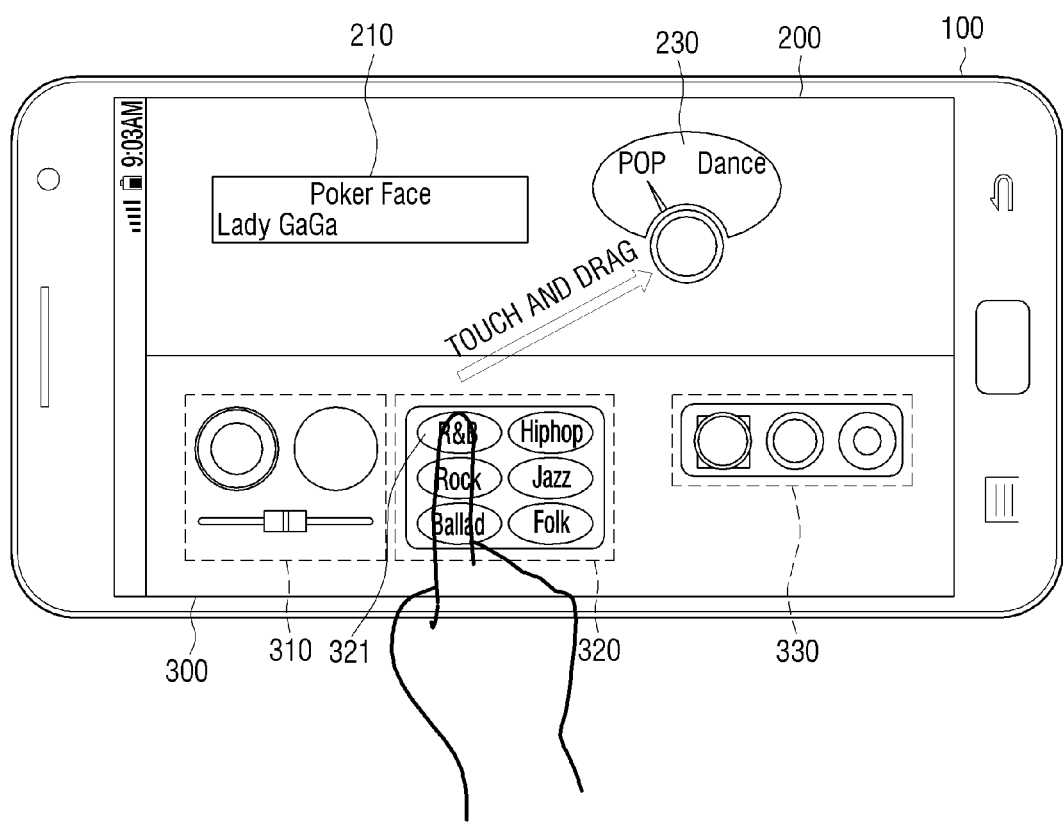

For example, when one of UI elements 320, mapped to a function of reproducing genre-specific music, is touched and the touched UI element 320 is dragged to the UI element 230 displayed on the main UI screen 200, as in FIG. 5, the controller 130 may display a UI element 321 by moving the UI element 321, to which the touch and drag operation has been input, to the UI element 230.

In this case, in a state in which the sub-UI screen 300 is displayed and the UI element 230 is removed from the main UI screen 200, the controller 130 may position a touch point in the touch and drag operation in an upper region of the main UI screen 200 and display the removed main UI screen 200. When the touch on the UI element 321 is released from the UI element 230, the controller 130 may add an R&B genre to the UI element 230, as in FIG. 6.

Figure 7:
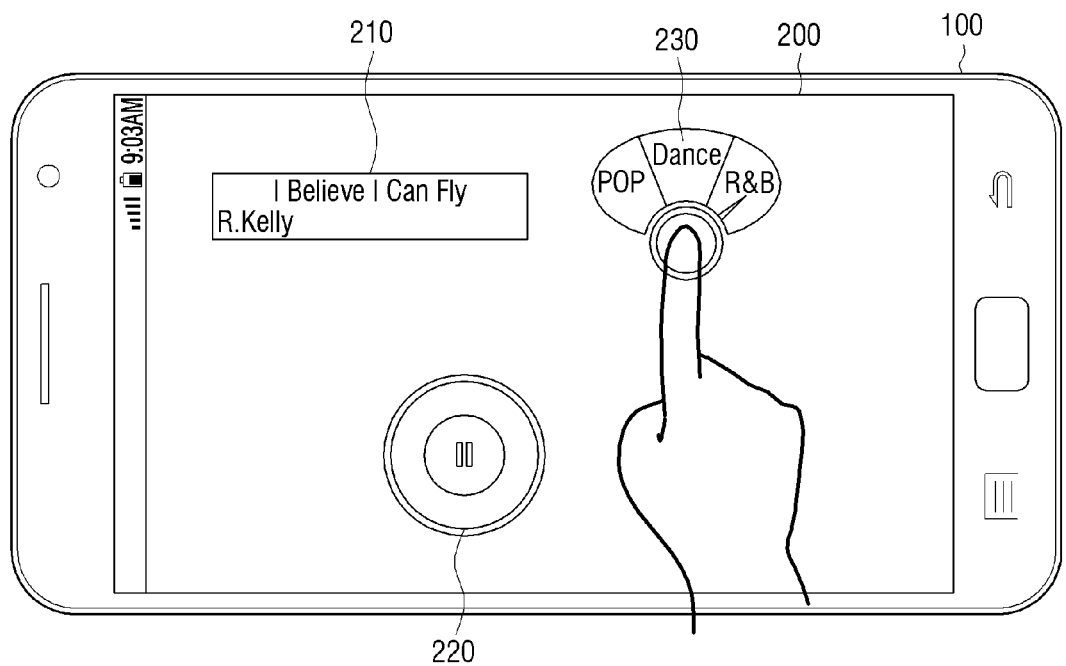

When a user command for rotating the wheel UI element 230, displayed on the main UI screen 200, and selecting the R&B genre is input, as in FIG. 7, the UI element 230 may be changed so that the R&B genre is selected and the R&B music may be sequentially reproduced by generating a playlist including music of the R&B genre.

Figure 6:
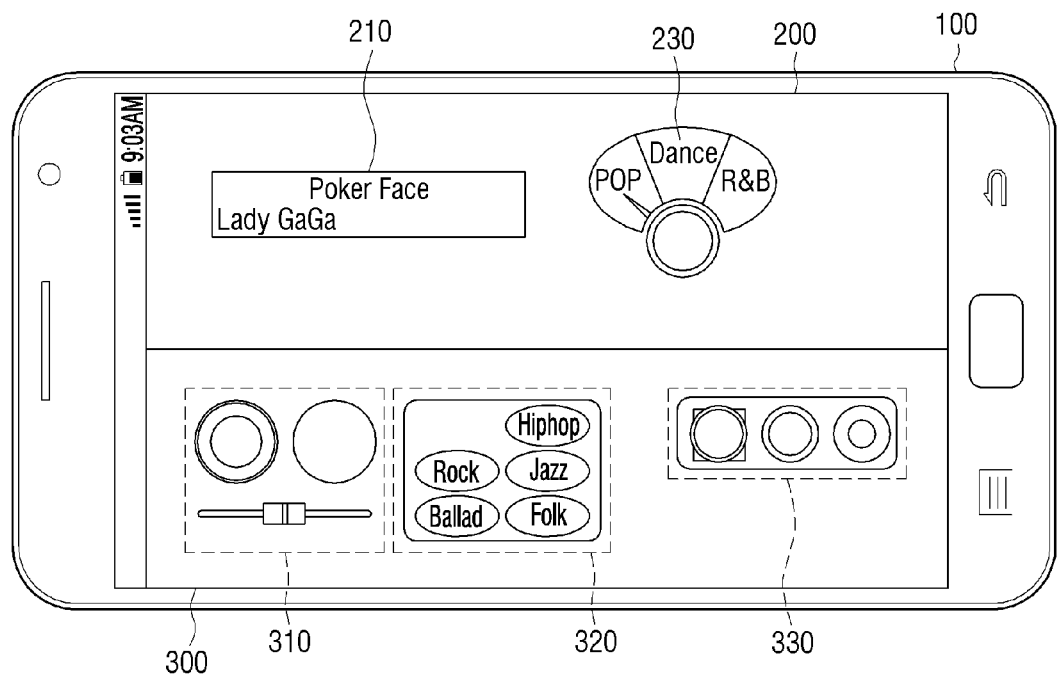

As described with reference to FIGS. 5 to 7, when the UI elements 320, mapped to a function of reproducing genre-specific music represented in a button type, are positioned to overlap each other on the main UI screen 200 according to the user command, the controller 130 may deform and display the UI elements 320 in a wheel graphic. When the UI elements 320, mapped to the function of reproducing the genre-specific music, are not positioned to overlap each other on the main UI screen 200, the controller 130 may display the UI elements 320 as the button type. In this case, the controller 130 may reproduce music of a specific genre according to the user command for touching a corresponding UI element.

Figure 8:
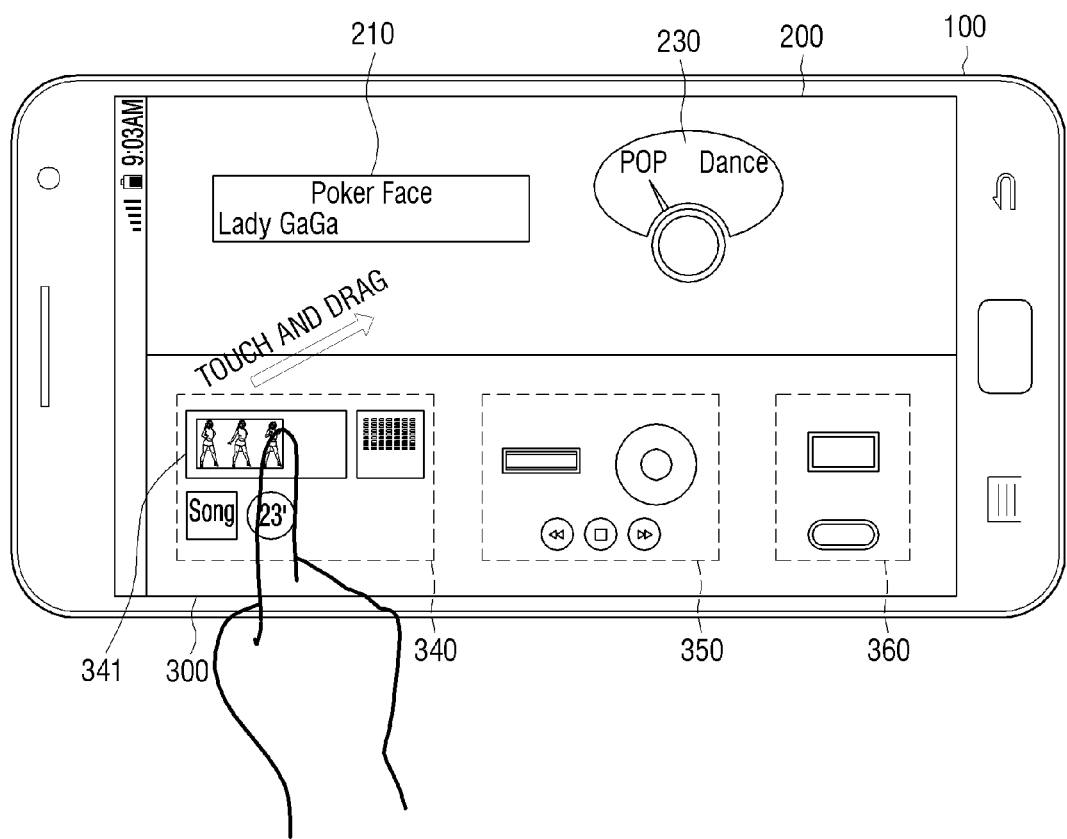
Figure 9:
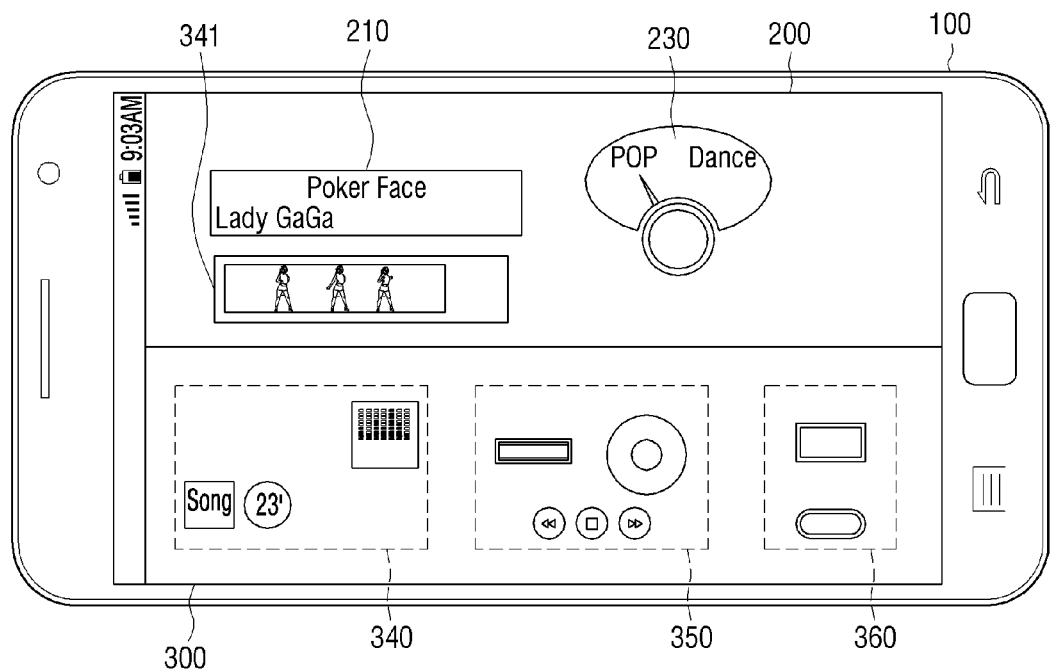

In addition, when one of UI elements 340 for providing information about music is touched and dragged to the main UI screen 200, as in FIGS. 8 and 9, the controller 130 may move a UI element 341, to which the touch and drag operation is input, to the main UI screen 200 and display the UI element 341 on the main UI screen 200. When the touch on the UI element 341 is released in an empty region of the main UI screen 200, the controller 130 may display the UI element 341 at a position at which the touch is released and display an image (e.g., an album image) associated with music currently being reproduced through the UI element 341.

Figure 10:
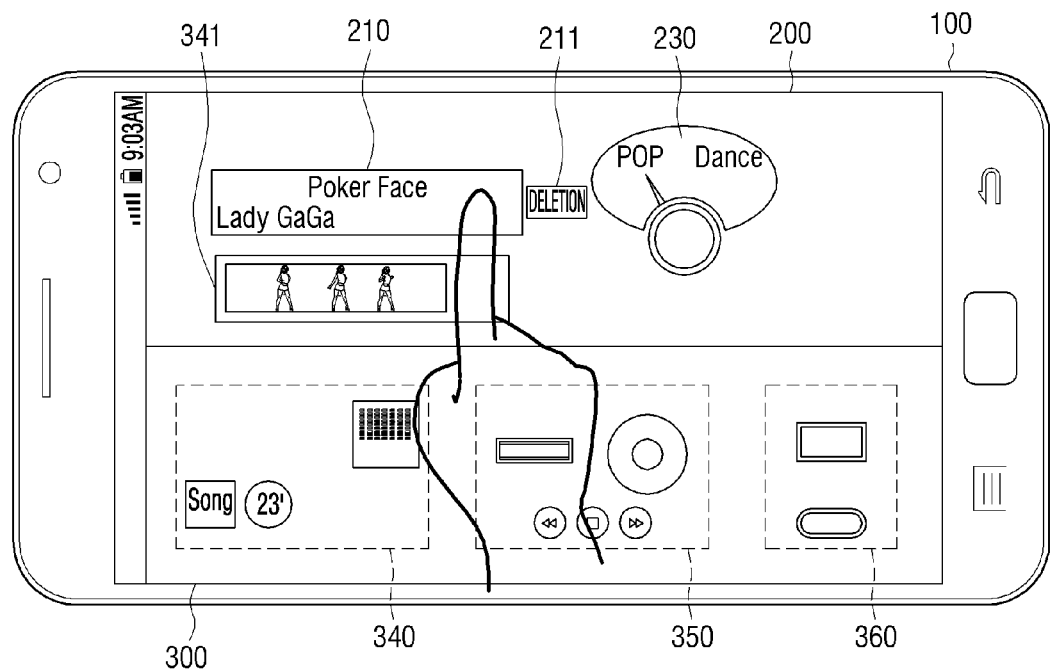
Figure 11:
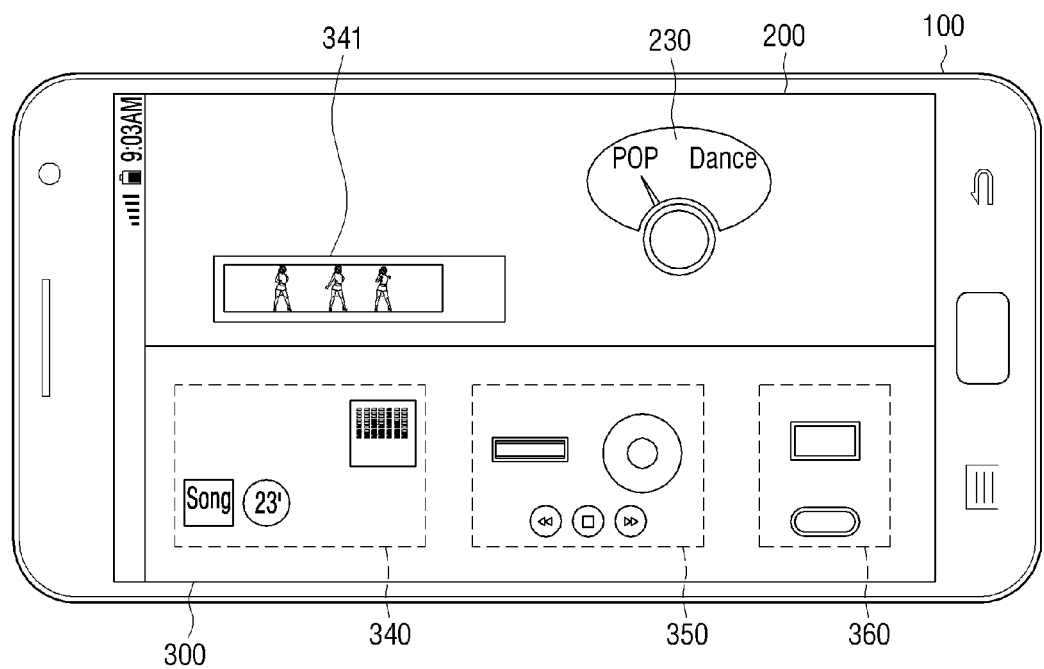

Thereafter, when the user command is input by touching the UI element 210 for a preset time or more, as in FIGS. 10 and 11, the controller 130 may display a deletion item 211 for deleting the UI element 210. When the deletion item 211 is selected, the controller 130 may remove the UI element 210 on the main UI screen 200.

Figure 12:
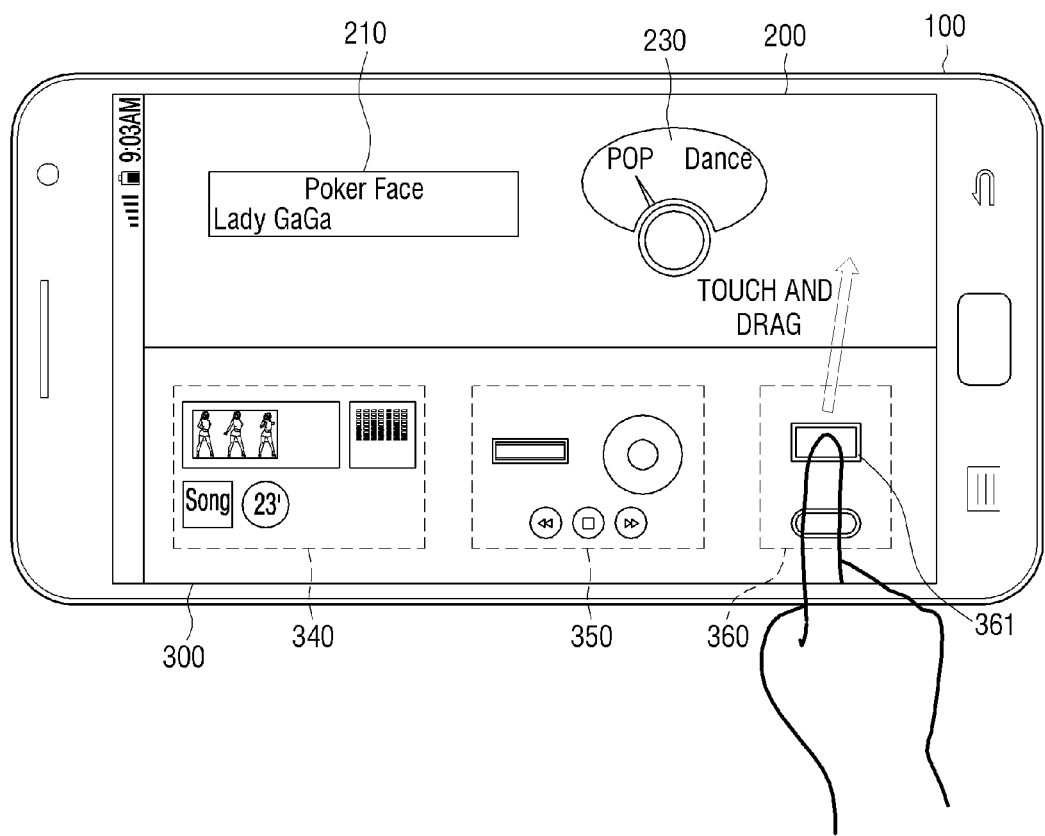
Figure 13:
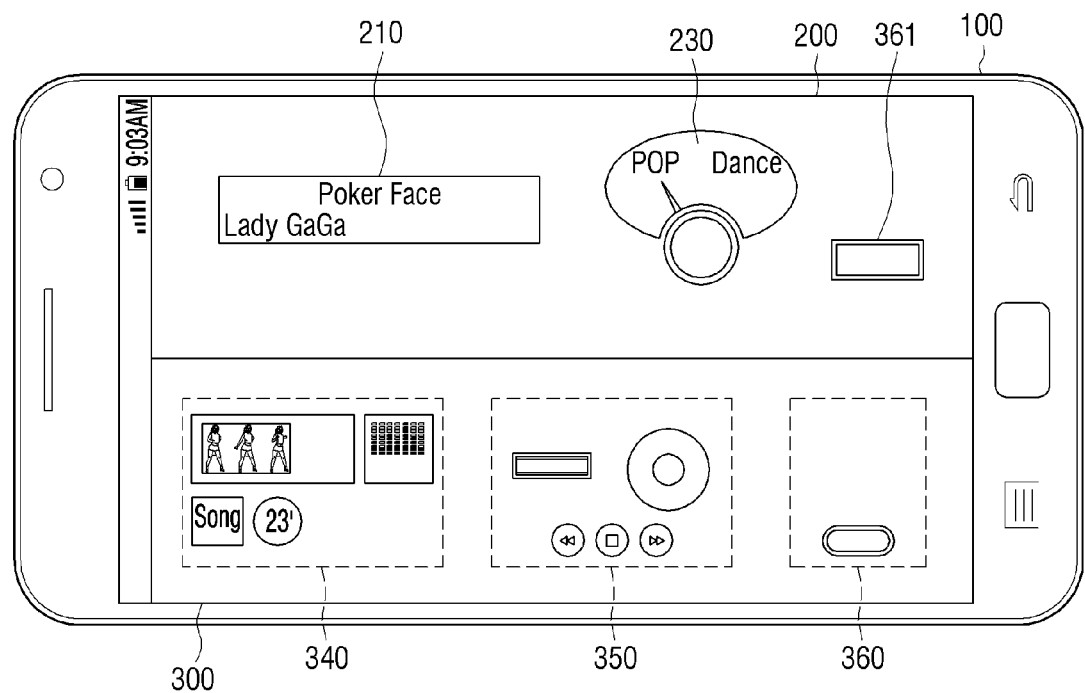

In addition, when one of UI elements 360, mapped to a function of reproducing music corresponding to a keyword input by the user, is touched and dragged to the main UI screen 200, as in FIGS. 12 and 13, the controller 130 may move a UI element 361, to which the touch and drag operation is input, to the main UI screen 200 and display the UI element 361 on the main UI screen 200. When the touch on the UI element 361 is released in an empty region of the main UI screen 200, the controller 130 may display the UI element 361 at a position at which the touch is released.

Figure 14:
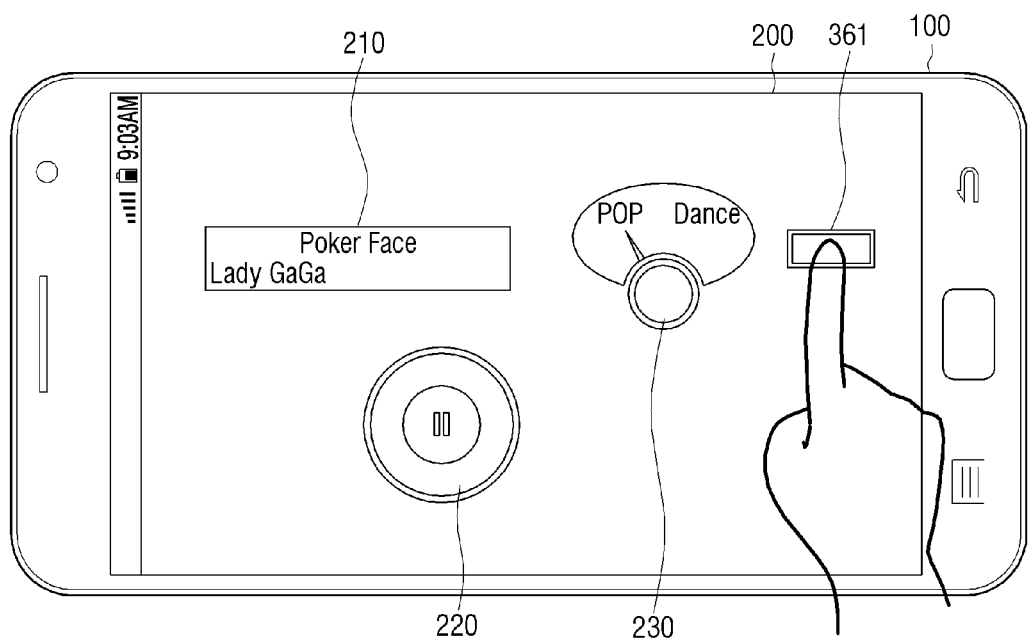

Thereafter, when the UI element 361 displayed on the main UI screen 200, as in FIG. 14, is selected, the controller 130 may perform a control so that a microphone (not illustrated) provided in the display apparatus 100 is activated, the user's voice is collected, and the collected voice of the user is transmitted to the external server (not illustrated) which is capable of providing a voice recognition-related service.

The external server (not illustrated) may convert the user's voice received from the display apparatus 100 into text and extract a keyword associated with music from the user's voice. Specifically, the external server (not illustrated) may store various keywords such as a music title, an album name, and a singer's name and extract a word matching a pre-stored keyword from the user's voice. The external server (not illustrated) may transmit a keyword associated with the music extracted from the user's voice to the display apparatus 100.

Figure 15:
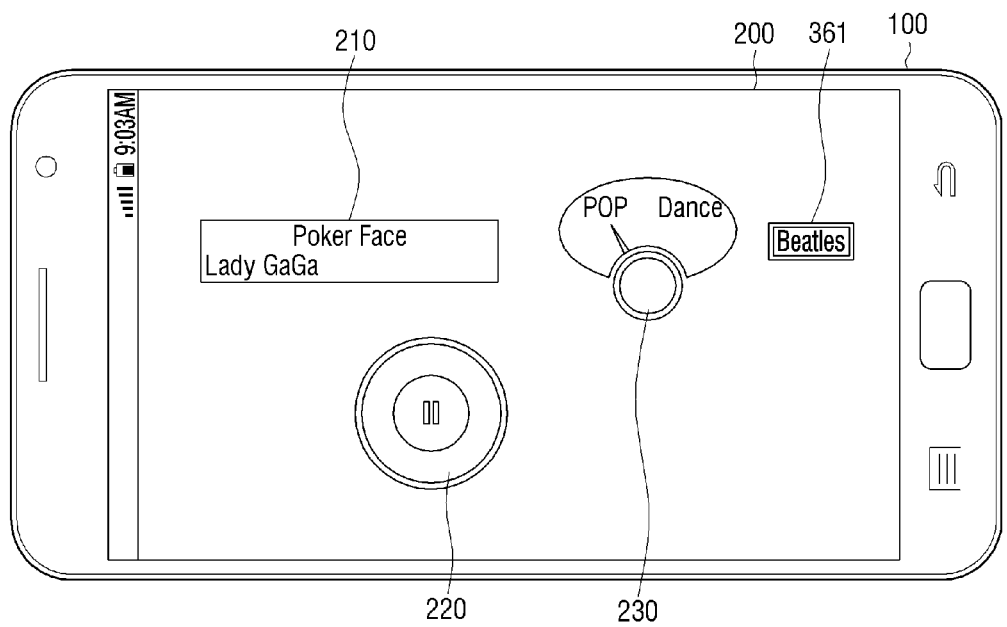
Figure 15:

When a keyword is received from the external server (not illustrated), the controller 130 may add the keyword to the UI element 361 displayed on the main UI screen 200 and display the UI element 361 to which the keyword is added. Here, the controller 130 may add a keyword itself or an image matching each keyword to the UI element 361. In the latter case, the controller 130 may add an image to the UI element 361 by searching for the image mapped to a keyword among pre-stored keyword-specific images or by searching for the image through a web search. For example, as in FIGS. 14 and 15, the controller 130 may add an image matching "The Beatles" to the UI element 361 when the user says: "The Beatles."

Although an example in which the user's voice for voice recognition is transmitted to the external server (not illustrated) has been described above, the controller 130 may include a voice recognition module (not illustrated) and extract a keyword associated with music by recognizing the user's voice.

When the UI element 361 displayed on the main UI screen 200 is re-selected, the controller 130 may generate a playlist including music consistent with the keyword and sequentially reproduce the music included in the playlist. Here, the music consistent with the keyword may be music sung by a corresponding singer when the keyword is a singer's name.

Specifically, the controller 130 may search for music consistent with a keyword by referring to metadata of music pre-stored in the display apparatus 100, generate a playlist constituted of the searched music, and sequentially reproduce the music included in the playlist. In addition, the controller 130 may transmit a keyword to the external server (not illustrated) that provides a music streaming service, receive a playlist constituted of music consistent with the keyword, and reproduce sequentially streamed music included in the playlist. For example, in reference to FIG. 15, the controller 130 may sequentially reproduce the music of "The Beatles" when the user selects the UI element 361.

Figure 16:
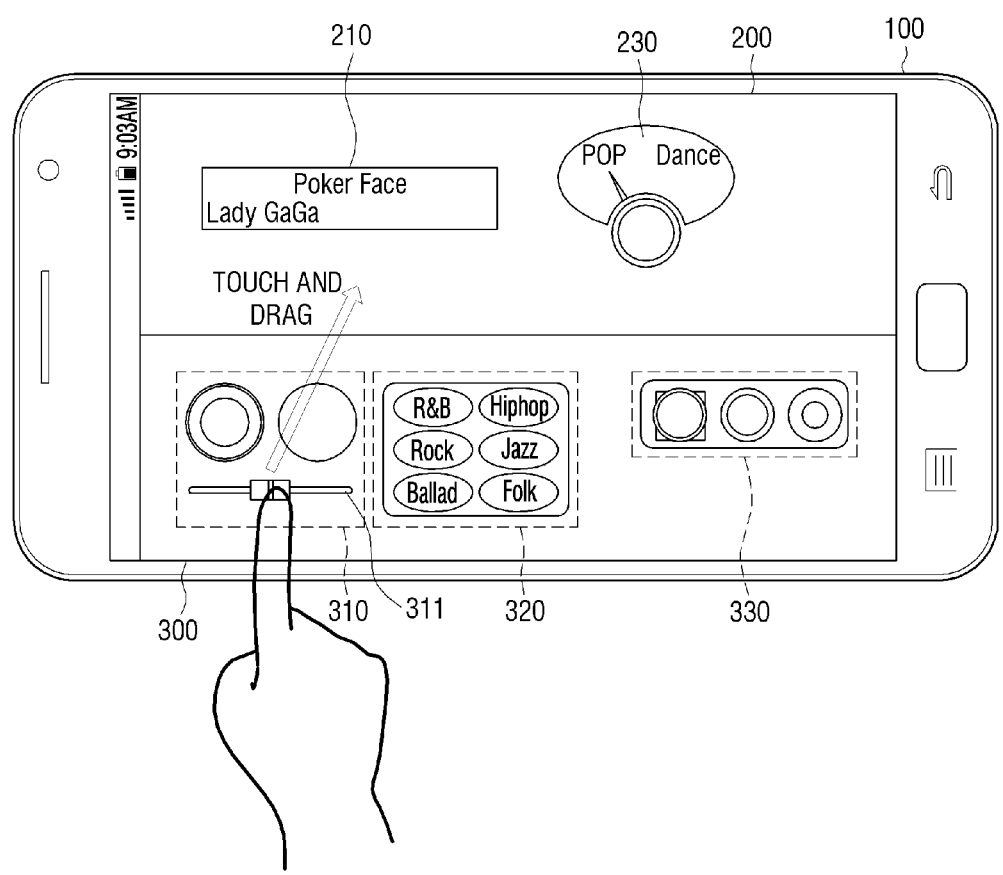
Figure 17:
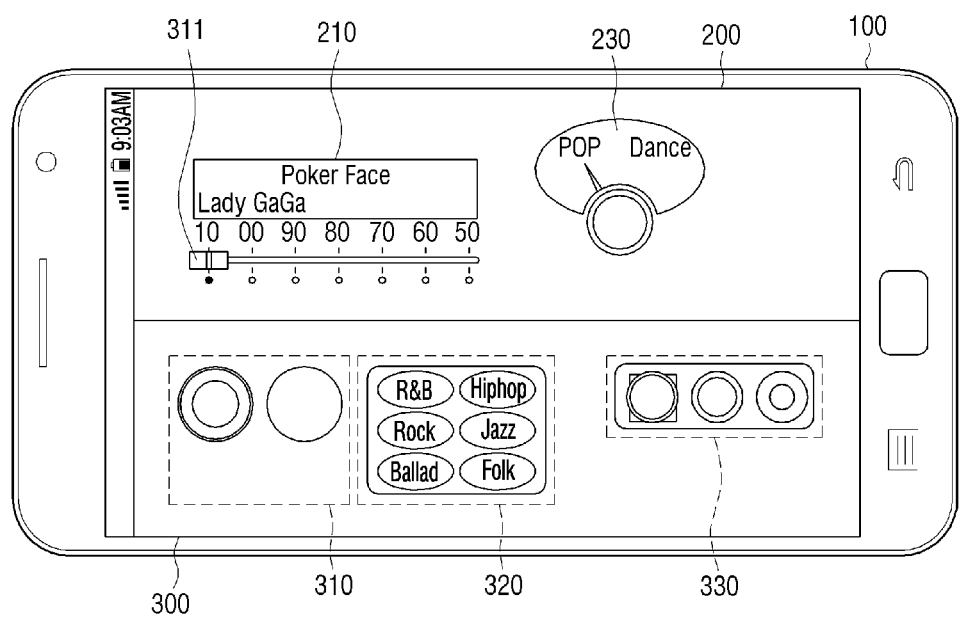

In addition, when one of the UI elements 310, mapped to a function of reproducing time band-specific music, is touched and dragged to the main UI screen 200, as in FIGS. 16 and 17, the controller 130 may move a UI element 311, to which the touch and drag operation has been input, to the main UI screen 200 and display the UI element on the main UI screen 200. When the touch on the UI element 311 is released in an empty region of the main UI screen 200, the controller 130 may display the UI element 311 at a position at which the touch has been released.

In this case, the controller 130 may group music corresponding to a user command input through another UI element according to each release year (or a manufacturing year) and determine a scale of the UI element 311 for receiving the selection of music grouped according to each release year. The controller 130 may represent the UI element 311 in the determined scale and display the represented UI element 311 on the main UI screen 200.

Specifically, in reference to FIGS. 16 and 17, in a state in which POP music has been selected through the UI element 230, the controller 130 determines the scale of the UI element 311 by checking the release years of the POP music. For example, when the POP music is grouped into 1950s, 1960s, 1970s, 1980s, 1990s, 2000s, and 2010s according to each release year, the controller 130 may make a determination for which a 7-step scale is required to receive the selection of the release year and display the jog bar UI element 311 on the main UI screen 200 by configuring the jog bar UI element 311 on the main UI screen 200 to include 7 steps.

Thereafter, the controller 130 may generate a playlist including grouped music according to each release year, and sequentially reproduce music included in the playlist corresponding to the release year selected by the UI element 311.

Figure 18:
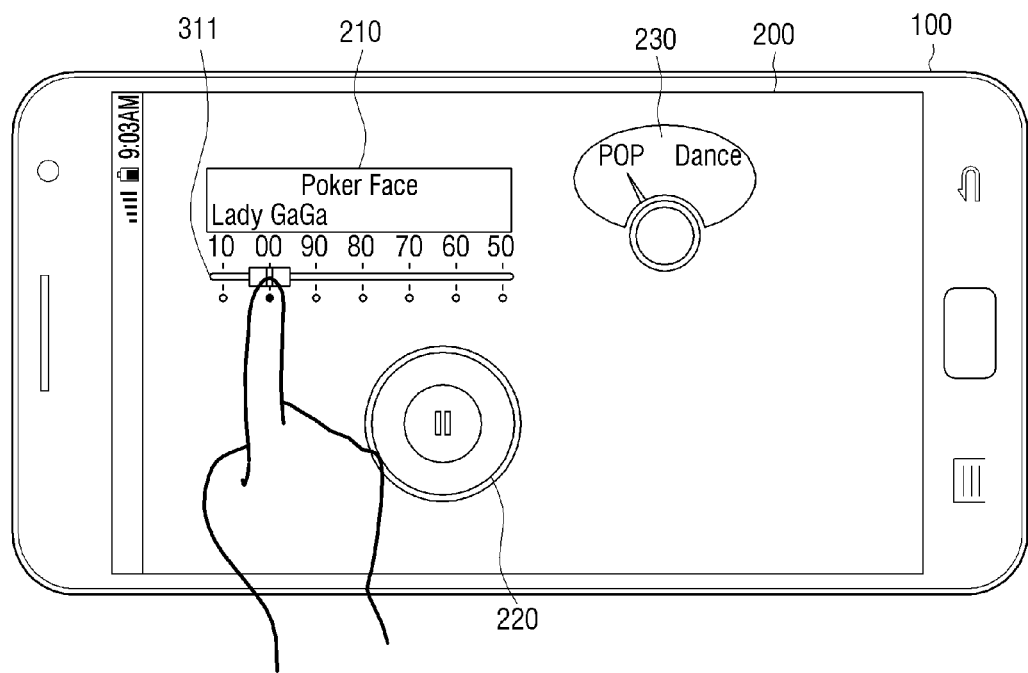

For example, when the jog bar UI element 311 displayed on the main UI screen 200 is touched to input a user command for moving the jog bar UI element 311 to a position indicating the 2000s (i.e., "00"), as in FIG. 18, the controller 130 may sequentially reproduce music included in a playlist constituted of music released in 2000s from among the POP music.

In addition, when a user command for changing the genre through the UI element 230 is input, the controller 130 may change the scale of the UI element 311 according to the changed genre. Specifically, the controller 130 may group music corresponding to the changed genre according to each release year and determine the scale of the UI element 311 for receiving the selection of music grouped according to each release year. The controller 130 may represent the UI element 311 in the determined scale and display the represented UI element 311 on the main UI screen 200.

Figure 19:
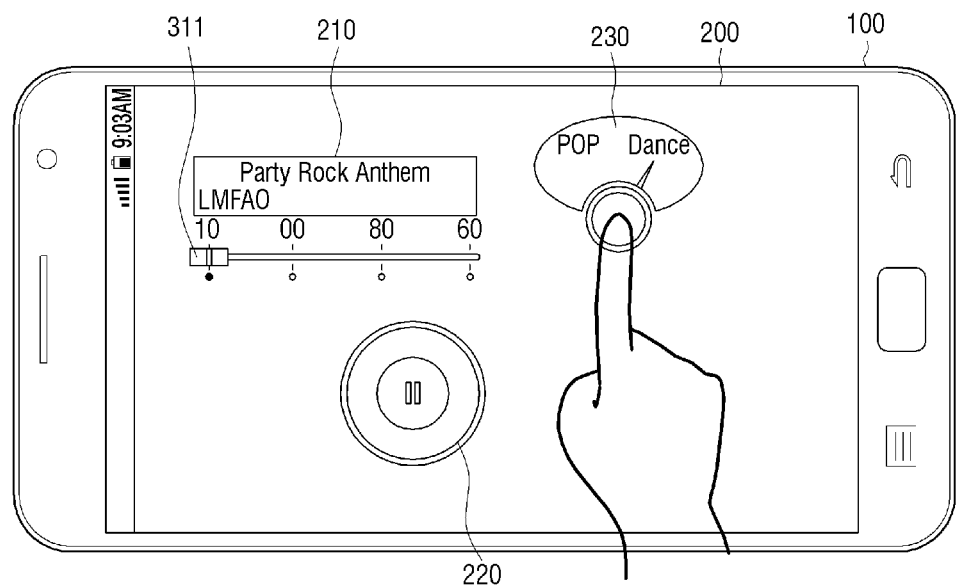

For example, when a user command for changing a genre to Dance is input through the UI element 230, as in FIG. 19, the controller 130 determines the scale of a UI element 361 by checking the release years of Dance music. That is, when the Dance music is grouped into 1960s, 1980s, 2000s, and 2010s according to each release year, the controller 130 may make a determination for which a 4-step scale is required to receive the selection of the release year and display the jog bar UI element 311 on the main UI screen 200 by configuring the jog bar UI element 311 on the main UI screen 200 to include 4 steps.

Although an example in which music corresponding to a genre selected by the user is grouped according to each release year has been described above, music corresponding to a user command selected by another UI element may be grouped according to each release year and provided to the user.

For example, the controller 130 may group music searched for by the UI element 361, mapped to a function of reproducing music corresponding to a keyword input by the user, according to each release year to generate a playlist. For example, when the UI element 361 to which "The Beatles" is added is selected, the controller 130 may generate a playlist by grouping the music of "The Beatles" according to each release year and sequentially reproduce music included in the playlist corresponding to a selected release year selected by the UI element 311. In this case, the controller 130 may change the scale of the UI element 311 for the music of "The Beatles" according to the release year.

Figure 20:
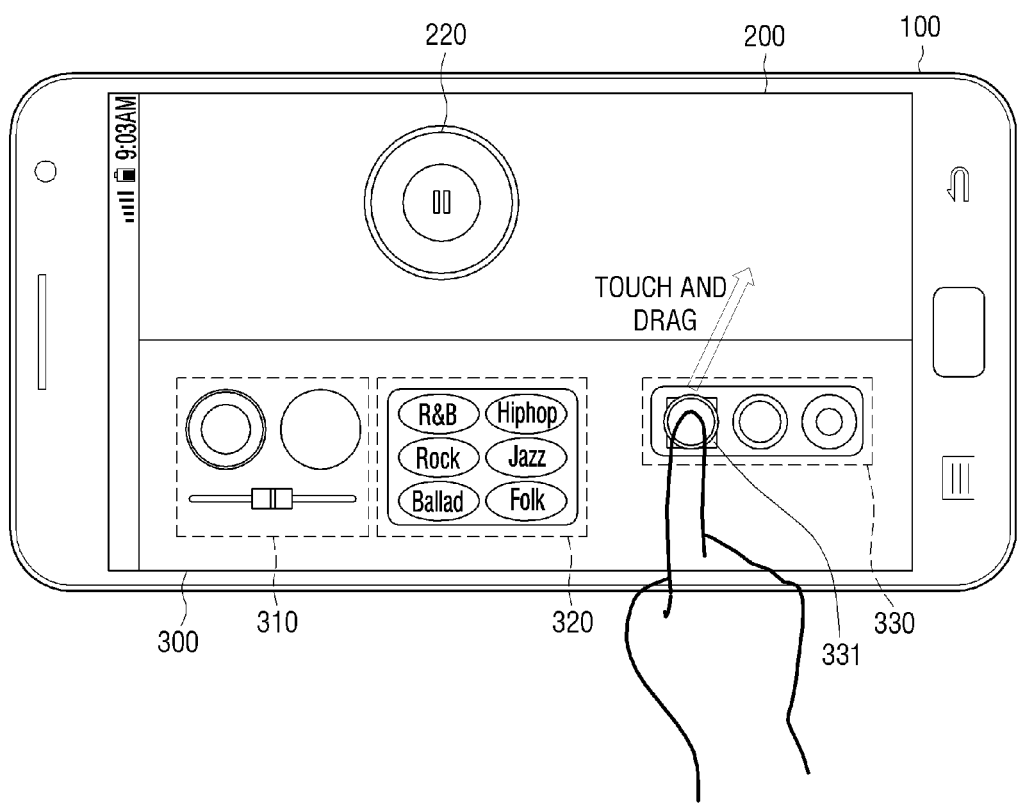
Figure 21:
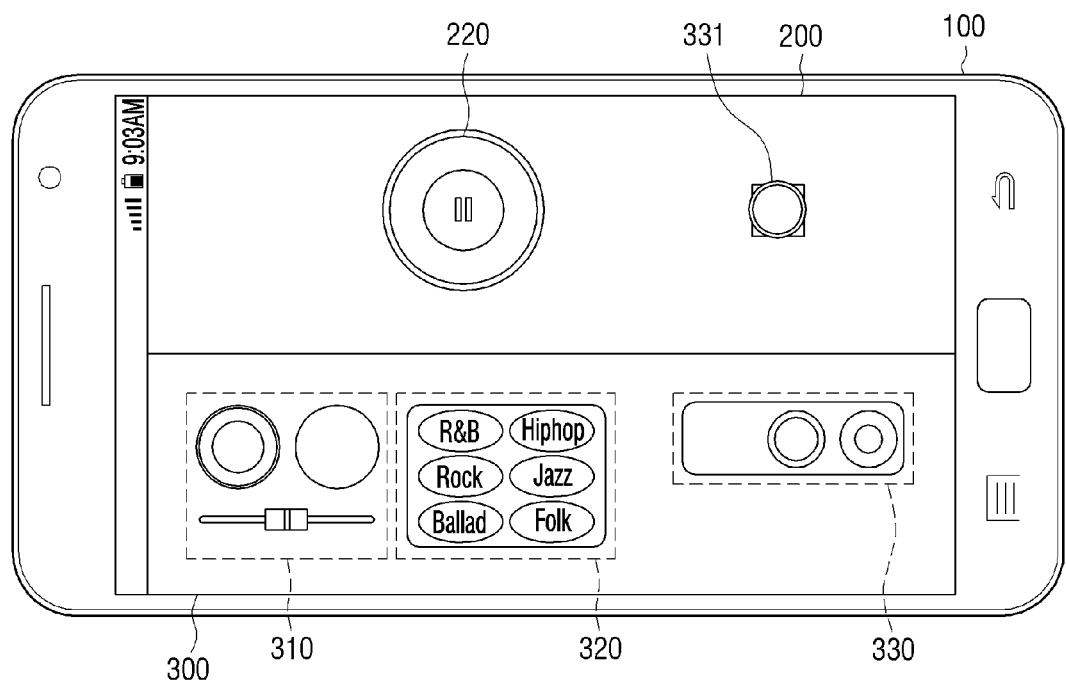

When one of the UI elements 330, mapped to a function of reproducing other music associated with music currently being reproduced, is touched, and dragged to the main UI screen 200, as in FIGS. 20 and 21, a UI element 331 to which the touch and drag operation has been input may be moved to and displayed on the main UI screen 200. When the touch on the UI element 331 is released in an empty region of the main UI screen 200, the controller 130 may display the UI element 331 at a position at which the touch has been released.

The UI element 331 dragged to the main UI screen 200 may be a UI element in which a function mapped to the UI element 331 is executed when the pinch-out operation is input and the executed function is stopped when the pinch-in operation is input.

Figure 22:
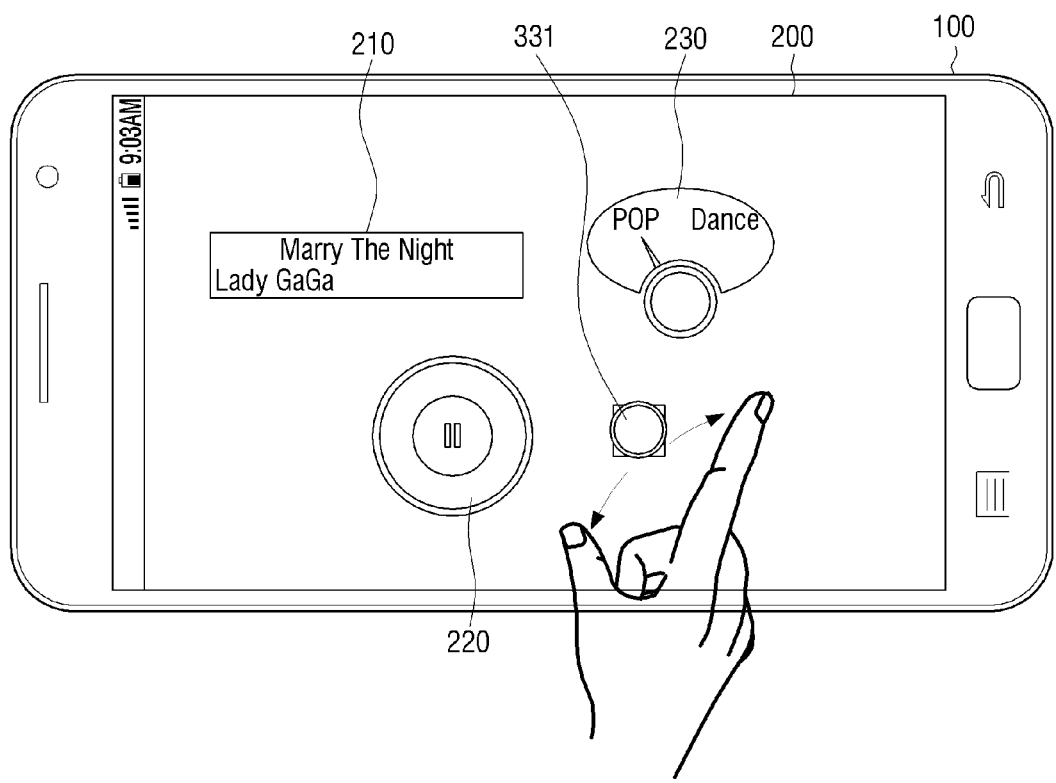

Thus, the controller 130 may generate a playlist constituted of other music associated with music currently being reproduced when the pinch-out operation is input to the UI element 331 displayed on the main UI screen 200, as in FIG. 22, and sequentially reproduce music included in the playlist. That is, the controller 130 may generate a playlist constituted of other music sung by a singer of music currently being reproduced and sequentially reproduce the music included in the playlist. For example, it is assumed that singers of POP music included in the playlist currently being reproduced are A, B, C, D, E, F, G, H, etc. In this case, when the pinch-out operation is input to the UI element 331 while music of a singer D is reproduced, the controller 130 may generate a playlist constituted of other music sung by the singer D and sequentially reproduce music of the singer D included in the playlist.

Figure 23:
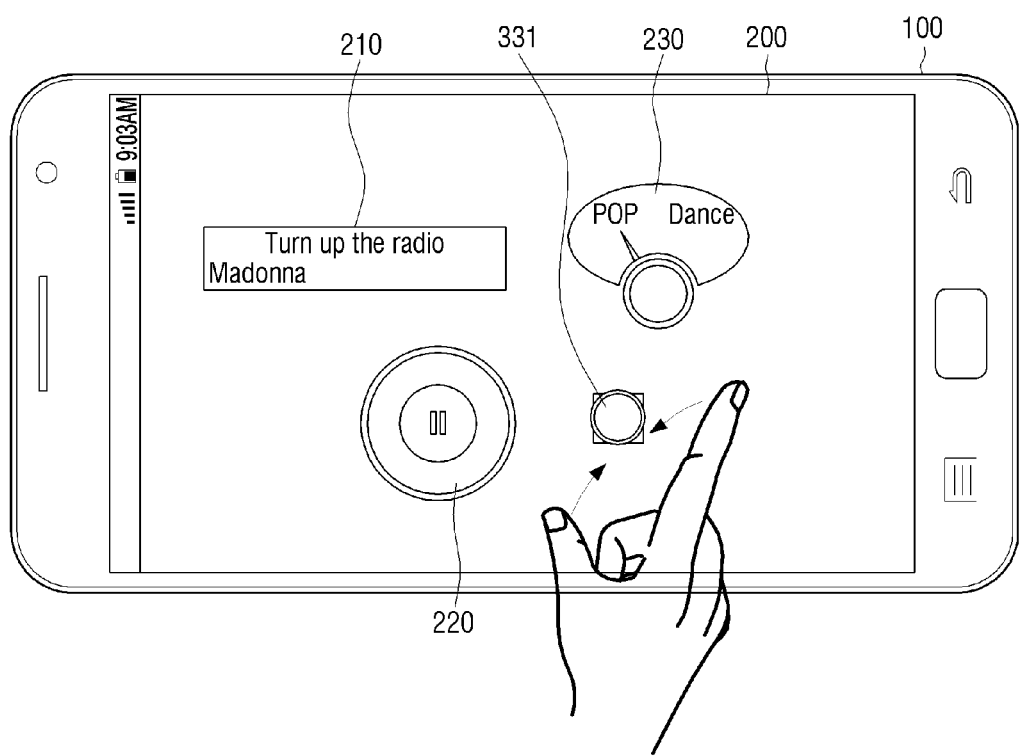

Thereafter, when the pinch-in operation is input to the UI element 331, as in FIG. 23, the controller 130 may sequentially reproduce the music which was being reproduced before the pinch-out operation was input. In the above-described example, when the pinch-in operation is input while the music included in the playlist constituted of other music sung by the singer D is sequentially reproduced, the controller 130 may sequentially reproduce music from music sung by a singer E in the previous playlist. Thus, the user can conveniently enjoy music of his/her desired singer.

The UI element may be considered as a sub-widget in that a function associated with content reproduction is mapped. That is, the UI element may be implemented as a sub-widget constituting a widget which provides a function of controlling content reproduction.

For example, when the widget for controlling music reproduction is implemented as a sub-widget for performing sub-functions such as a play function, a pause function, a function of the next music reproduction, and a function of the previous music reproduction, the UI element of the exemplary embodiments may be considered as a sub-widget in a widget which controls music reproduction in that the play function, the pause function, the function of the next music reproduction, and the function of the previous music reproduction are mapped. From this viewpoint, it can be seen that a main UI screen is configured using the UI element functioning as the sub-widget in the exemplary embodiments.

Figure 24:
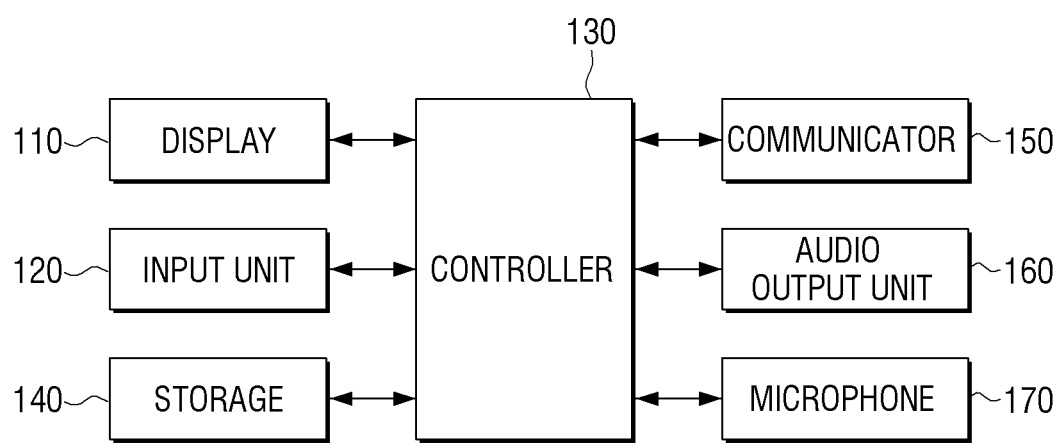
FIG. 24 is a block diagram illustrating a detailed configuration of the display apparatus according to an exemplary embodiment.

FIG. 24 is a block diagram illustrating a detailed configuration of the display apparatus according to an exemplary embodiment. According to FIG. 24, the display apparatus 100 may include a storage 140, a communicator 150, an audio output unit 160, and a microphone 170, in addition to the components illustrated in FIG. 1.

The storage 140 may store various data for driving and controlling the display apparatus 100 and application programs executable in an operating system (OS) and the display apparatus 100. Here, the application program may include an application capable of controlling music reproduction.

In addition, the storage 140 may store various graphic elements for configuring a UI screen. Here, the graphic element may be a graphic element mapped to a function associated with content reproduction.

In addition, the storage 140 may store content capable of being reproduced by the display apparatus 100. Here, the content may include music, a moving image, a still image, and the like.

In addition, the storage 140 may store a final state of the main UI screen. In this case, the storage 140 may store the final state of the main UI screen according to authentication information.

The storage 140 that performs such a function may be implemented as various types of storage media such as a non-volatile memory (e.g., a flash memory or an electrically erasable read only memory (EEROM)), a hard disk, and the like.

The communicator 150 may perform network communication using various communication schemes. Specifically, the communicator 150 can perform network communication with an external server (not illustrated) using various communication schemes such as 3rd generation (3G), 3rd generation partnership project (3GPP), long term evolution (LTE), wireless fidelity (WiFi), and a wired/wireless local area network (LAN). For this, the communicator 150 may include various communication modules for performing network communication according to each communication scheme.

The audio output unit 160 may be implemented as a speaker, an audio output port, and the like, and is an element for outputting various audio data. Here, audio data may constitute content. Also, the audio output unit 160 may output various notification sounds, a sound message, and the like.

The microphone 170 is an element for collecting the user's voice. The user's voice input through the microphone 170 may be used in a call process or transmitted to the external server (not illustrated) through voice recognition.

Figure 25:
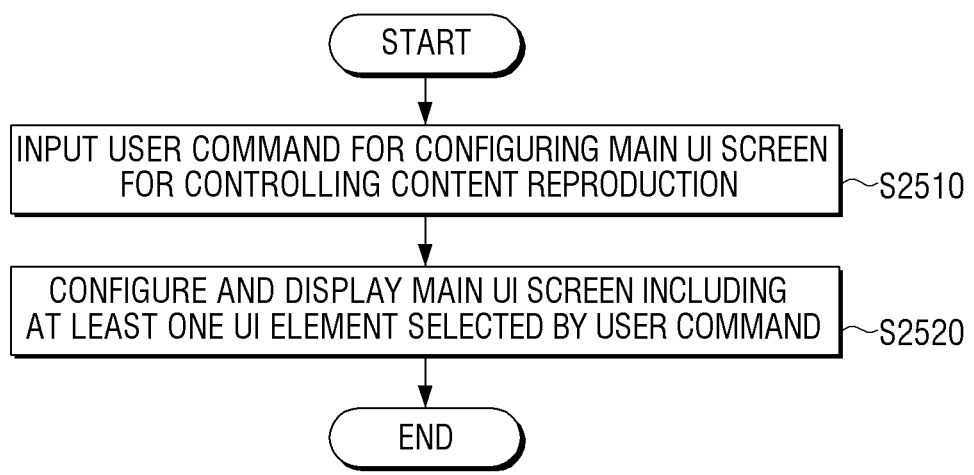
FIG. 25 is a flowchart illustrating a UI screen displaying method according to an exemplary embodiment.

FIG. 25 is a flowchart illustrating a UI screen displaying method according to an exemplary embodiment.

First, a user command for configuring a main UI screen for controlling content reproduction is received (S2510).

Thereafter, the main UI screen including at least one UI element selected by the user command is configured and displayed (S2520). Here, as a graphic element mapped to a function associated with content reproduction, the at least one UI element may include at least one of a UI element mapped to a function of reproducing genre-specific content, a UI element mapped to a function of reproducing time band-specific content, a UI element mapped to a function of reproducing content corresponding to a keyword input by the user, and a UI element mapped to a function of reproducing other content associated with content currently being reproduced.

Specifically, when a preset event is generated in step S2520, a sub-UI screen including a plurality of UI elements may be displayed, and a main UI screen including at least one UI element selected on the sub-UI screen may be configured and displayed.

More specifically, the main UI screen and the sub-UI screen are simultaneously displayed. According to a user command for selecting a UI element displayed on the sub-UI screen and moving the selected UI element to the main UI screen, the selected UI element may be moved to and displayed on the main UI screen.

In addition, in step S2520, a plurality of UI elements mapped to different graphic elements having the same function associated with content reproduction may be displayed on the sub-UI screen. Here, the plurality of UI elements may be grouped based on functions provided by the plurality of UI elements, and UI elements that provide the same function may be displayed in regions adjacent to each other.

In addition, in step S2520, a plurality of UI elements mapped to different graphic elements having different functions associated with content reproduction may be displayed on the sub-UI screen.

In addition, in step S2520, at least one UI element displayed on the main UI screen may be removed according to the user command.

A non-transitory computer-readable medium storing a program for sequentially performing the UI screen displaying method according to the exemplary embodiments may be provided.

The non-transitory computer-readable medium refers to a device-readable medium that semi-permanently stores data. Specifically, the above-described various middleware or programs stored in a non-transitory computer readable medium such as a compact disc (CD), a digital versatile disc (DVD), a hard disk, a Blu-ray disc, a universal serial bus (USB), a memory card, or a read only memory (ROM), may be provided.

In addition, although no bus is illustrated in the above-described block diagram illustrating the display apparatus, communication between elements in the display apparatus may be performed through the bus. In addition, the display apparatus may further include a CPU that performs the above-described various steps, a processor such as a microprocessor, and the like.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display;
an input unit configured to receive a user command; and
a controller configured to display a main user interface (UI) comprising a composite category icon and a sub-UI comprising a plurality of UI elements on the display, when the user command for moving a UI element among the plurality of UI elements to the composite category icon of the main UI is received, move the selected UI element from the sub-UI to the composite category icon of the main UI without executing a function mapped to the selected UI element, and when the user command for selecting the moved UI element displayed on the composite category icon of the main UI is received after the sub-UI is removed on the display, execute the function mapped to the moved UI element to control contents.

2. The display apparatus as claimed in claim 1, wherein the controller is further configured to simultaneously display the main UI screen and the sub-UI screen on the display.

3. The display apparatus as claimed in claim 1, wherein the plurality of UI elements are mapped to different graphic elements having the same function associated with the content reproduction.

4. The display apparatus as claimed in claim 3, wherein the controller is further configured to group the plurality of UI elements based on functions provided by the plurality of UI elements and display UI elements that provide the same function in regions adjacent to each other.

5. The display apparatus as claimed in claim 1, wherein the plurality of UI elements are mapped to different graphic elements having different functions associated with the content reproduction.

6. The display apparatus as claimed in claim 1, wherein the controller is further configured to remove at least one UI element displayed on the main UI screen according to the user command.

7. The display apparatus as claimed in claim 1, wherein the plurality of UI elements includes at least one of a UI element mapped to a function of reproducing genre-specific content, a UI element mapped to a function of reproducing time band-specific content, a UI element mapped to a function of reproducing content corresponding to a keyword input by a user, and a UI element mapped to a function of reproducing other content associated with content currently being reproduced.

8. A user interface (UI) screen displaying method for use in a display apparatus, comprising:
receiving a user command;
displaying a main UI comprising a composite category icon and a sub-UI comprising a plurality of UI elements on a display of the display apparatus;
when the user command for moving a UI element among the plurality of UI elements to the composite category icon of the main UI is received, moving the selected UI element from the sub-UI to the composite category icon of the main UI without executing a function mapped to the selected UI element; and
when the user command for selecting the moved UI element displayed on the composite category icon of the main UI is received after the sub-UI is removed on the display, executing the function mapped to the moved UI element to control contents.

9. The UI screen displaying method as claimed in claim 8, wherein the displaying further includes:
simultaneously displaying the main UI screen and the sub-UI screen.

10. The UI screen displaying method as claimed in claim 8, wherein the plurality of UI elements are mapped to different graphic elements having the same function associated with the content reproduction.

11. The UI screen displaying method as claimed in claim 10, wherein the displaying further includes grouping the plurality of UI elements based on functions provided by the plurality of UI elements and display UI elements that provide the same function in regions adjacent to each other.

12. The UI screen displaying method as claimed in claim 8, wherein the plurality of UI elements are mapped to different graphic elements having different functions associated with the content reproduction.

13. The UI screen displaying method as claimed in claim 8, wherein the displaying includes removing at least one UI element displayed on the main UI screen according to the user command.

14. The UI screen displaying method as claimed in claim 8, wherein the plurality of UI elements includes at least one of a UI element mapped to a function of reproducing genre-specific content, a UI element mapped to a function of reproducing time band-specific content, a UI element mapped to a function of reproducing content corresponding to a keyword input by a user, and a UI element mapped to a function of reproducing other content associated with content currently being reproduced.

15. A method of configuring a user interface (UI) screen of a content player, the method comprising:
displaying a main UI screen for controlling content reproduction on the content player on a display of the content player, the main UI screen including a composite category icon;
displaying concurrently with the main UI screen, if a first preset event occurs, a sub-UI screen which includes a plurality of UI elements on the display;
in response to receiving a user input to select and move a UI element of the plurality of UI elements to a position on the composite category icon of the main UI screen, moving the UI element to the position on the composite category icon of the main UI screen without executing a function mapped to the selected UI element; and
in response to receiving a user command for selecting the moved UI element displayed on the composite category icon of the main UI screen is received after the sub-UI screen is hidden on the display, executing the function mapped to the moved UI element to control contents.

16. The method of claim 15, wherein each of the plurality of UI elements is a graphic element mapped to a function associated with the content reproduction.

17. The method of claim 16, wherein the function associated with content reproduction includes at least one of: reproducing genre-specific content, reproducing time band-specific content, reproducing content corresponding to a keyword input by a user, and reproducing other content associated with content currently being reproduced.

18. The method of claim 15, further comprising hiding, if a second present event occurs, the concurrently displayed sub-UI screen.

19. The method of claim 15, further comprising saving a present configuration of UI elements on the main UI screen.

20. The method of claim 16, wherein the plurality of UI elements included on the sub-UI screen are displayed based on their respective functions and UI elements having the same function are displayed in regions adjacent to each other.

21. The method of claim 16, further comprising in response to receiving a user input to remove a UI element on the main UI screen, removing the UI element from the main UI screen.

22. The method of claim 15, wherein the content player comprises a smartphone including a touch screen, and the first present event and the user input are touch operations input by the user.

* * * * *